Sept. 21, 1948.   M. H. ARMS ET AL   2,449,831
CHUCK
Filed April 17, 1945   2 Sheets-Sheet 1
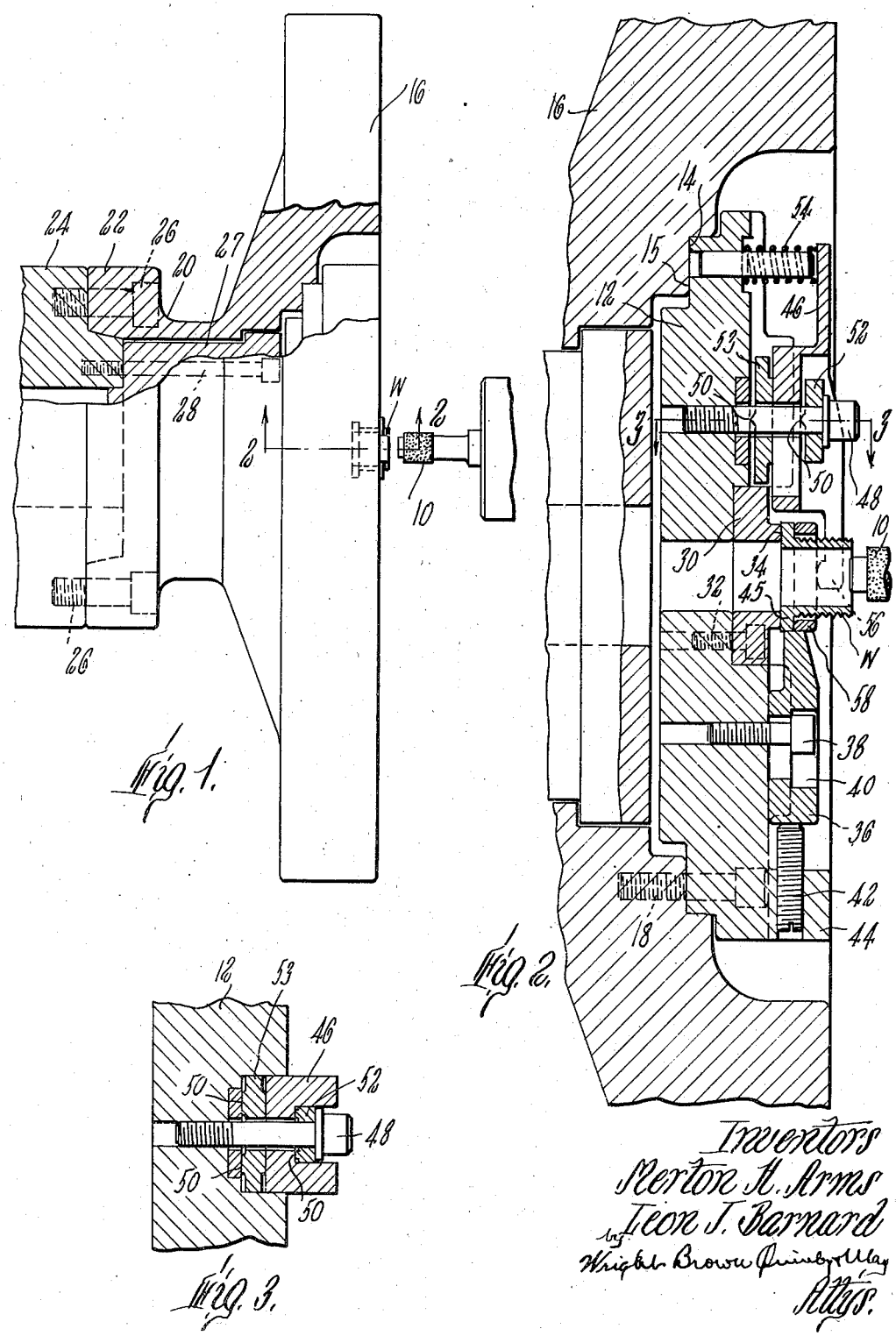

Patented Sept. 21, 1948

2,449,831

UNITED STATES PATENT OFFICE 2,449,831

CHUCK

Merton H. Arms and Leon J. Barnard, Springfield, Vt., assignors to Bryant Chucking Grinder Company, Springfield, Vt., a corporation of Vermont Application April 17, 1945, Serial No. 588,734

5 Claims. (Cl. 51—237)

1

This invention relates to improved chucks, and more especially to chucks for grinding machines designed for precision grinding. The invention further relates to chucks of the type adapted to be rotated while the work piece held thereby is being ground.

In precision grinding, a very high degree of accuracy is often required. For example, an internal cylindrical surface may have to be accurately round within a tolerance limit of a few millionths of an inch. In attaining accuracy of this order, it is evident that the contact of the grinding tool with the ground surface of the work must be very carefully controlled.

It is an object of this invention to provide a chuck which is constructed to cause uniformity of relative travel between the ground surface and the tool and thus to avoid irregularities of the depth of the layer of work removed by the grinding tool. To this end the chuck is made to rotate, the work being coaxial therewith, and is given a relatively great rotational inertia by any suitable means, such as a circular member of considerable diameter and mass secured thereto or made a part thereof. By rotating the chuck and work above the critical speed, where, due to centrifugal force, the center of rotation is about to coincide with the center of mass of the rotated parts they rotate about their own center of gravity which may or may not coincide with the axis at rest.

For a more complete disclosure of the invention, reference may be had to the following description thereof, and to the drawings, of which Figure 1 is a plan view of a chuck embodying the invention, and a grinding tool associated therewith, a portion being broken away to show in section.

Figure 2 is a similar view on a larger scale, mostly in section taken on the line 2—2 of Figure 1.

Figure 3 is a section on the line 3—3 of Figure 2.

Figure 4:
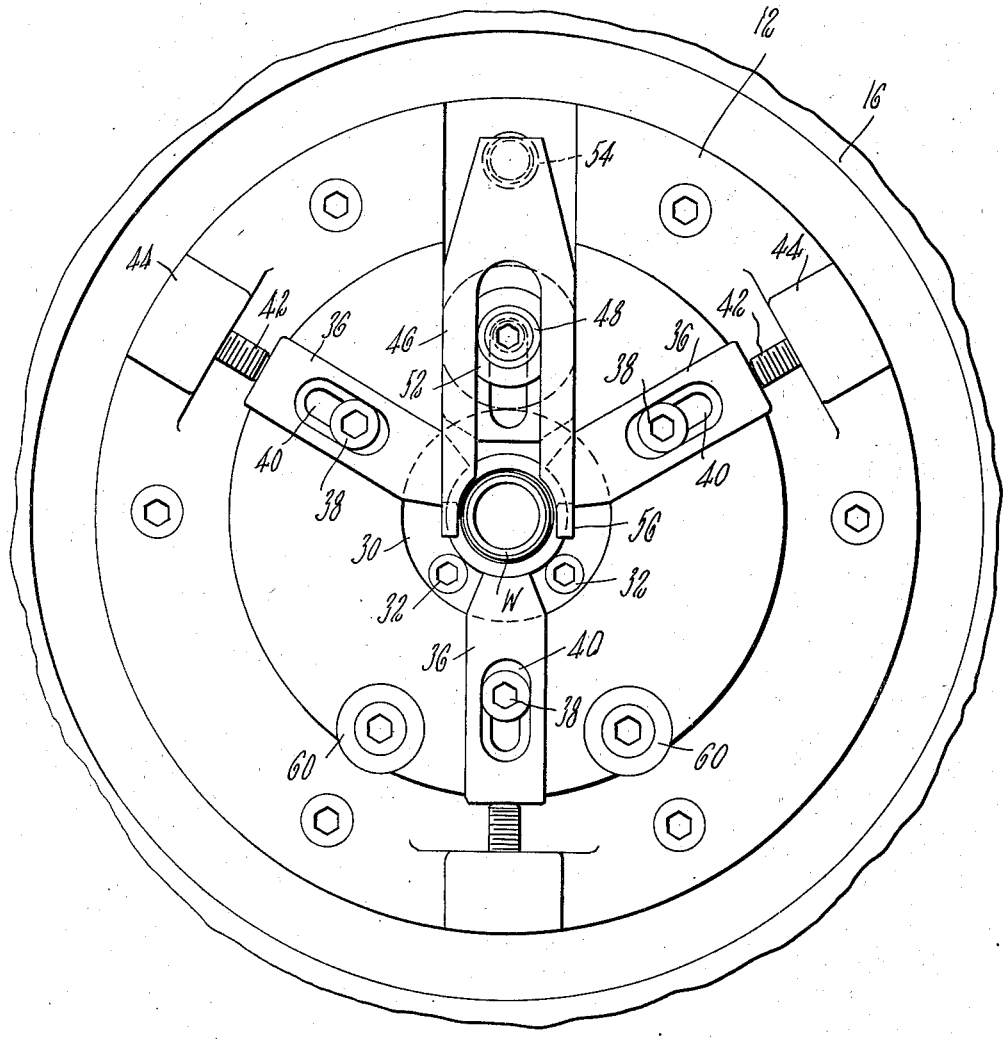
Figure 4 is a face view of the chuck shown in Figure 1.

The drawing illustrates a cylindrical grinding tool 10 adapted to be rotated at high speed to grind the interior cylindrical surface of a work piece W which, for example, may be a thimble. The work is held in a rotatable chuck which is massive in comparison with the work, the parts being formed so as to give the chuck as a whole a large rotational inertia.

The chuck comprises a chuck plate or disc 12 the rear face of which is stepped near the periphery so as to provide an annular shoulder 14 which

2 can be accurately machined to fit against a corresponding similar shoulder 15 in the recessed front face of a heavy disc 16 of considerably larger diameter, to which disc the chuck plate 12 is secured by suitable means such as a series of screws 18. The recessing of the front face of the disc 16 allows the work to be supported close to the rotational plane of the center of mass of the disc 16 and parts carried thereby. The disc 16 has a rearwardly extending relatively thin annular neck 20 terminating in a lip 22, the end face of which is shaped to be secured against the nose of a hollow work spindle 24 by a series of screws 26. Within the neck 20 and normally spaced slightly therefrom is a stop sleeve 27 secured to the spindle nose as by screws 28. Contact with the sleeve limits the flexing of the neck 20 when the chuck is rotated and the disc 16 tends to center its rotation about its mass axis. These members revolve about the work axis as a unit. The weight and diameter of the disc 16 add materially to the rotational inertia of the chuck, the disc thus having the function of a flywheel in promoting accurate uniformity of rotational velocity and lateral stability of the chuck. Such uniformity and stability is important in grinding operations of extremely great accuracy since the time the tool is in contact with successive elements of work surface over which it moves is a factor in determining the amount of material removed from each such element. Hence, any unevenness of relative movement between the tool and the work surface would result in uneven depth of material removed.

The chuck disc 12 is centrally countersunk to receive a ring 30 which is secured thereto by a number of screws 32. This ring has an annular surface 34 which is accurately ground to be in a plane perpendicular to the axis of the ring. An end of the work piece rests against the surface 34 when the work is set up in the chuck.

The work piece is laterally engaged by three jaws 36 symmetrically spaced around the axis. These jaws are radially arranged on the face of the chuck disc and are slidable in radial grooves in the face of the disc. Each jaw 36 is secured in adjusted position by a screw 38 which extends through a longitudinal slot 40 in the jaw and into a threaded hole in the disc. To provide for fine adjustment of the jaws longitudinally, each jaw is provided with a screw 42 which bears against its outer end and in threaded engagement with a boss 44 on the face of the disc 12 and adjacent to the circumference thereof. The inner ends of the jaws 36 bear against the work piece to keep it accurately centered.

The work piece is pressed firmly against the surface 34 during the grinding operation. For this purpose a forked lever 46 is rockably mounted on the disc. A screw 48 which is threaded into the disc 12 and projects therefrom between the legs of the lever 46 provides a fulcrum for the lever midway between its ends. The lever is engaged between washers 52 and 53 having suitable knife edges 50, the washer 52 being pressed against the head of the screw 48 by a spring 54 which is compressed between the face of the disc 12 and the outer end portion of the lever 46. The pressure of the spring 54 at the outer end of the lever causes the fingers 56 at the forked end of the lever to bear against the work piece or, as shown, against a ring 58 loosely surrounding the tubular portion of the work piece and pressing against the flange thereof.

Preferably the work piece has a portion such as the flange 45 accurately pre-ground to size and the inner ends of the jaws are also pre-ground so that no adjustment of the jaws is necessary for each work piece which is merely inserted in position and held by the lever 46. When necessary on account of wear, the jaws may be adjusted inwardly a slight amount and the work engaging faces reground in place of the proper diameter to center the work.

To preserve a dynamic balance in the chuck assembly, a pair of weights 60 are mounted on the disc to counterbalance the lever 46 and its associated parts.

From the foregoing description of an embodiment of this invention it will be evident to those skilled in the art that various changes and modifications might be made without departing from the spirit or scope of the invention.

We claim:

1. Apparatus of the class described comprising a rotary work spindle shaft, chuck mechanism including means for accurately centering the work, and a heavy disk having a relatively thin neck portion securing said disk coaxially to said shaft and supporting said chuck, said disk providing large rotational inertia to said mechanism and said neck portion providing a connection capable of flexing when said mechanism is rotated above critical speed.

2. A work-holding spindle comprising a shaft, a chuck secured thereto, said chuck including independently adjustable jaws, a spring-pressed lever to engage the work, and counterweights to provide dynamic balance, and an inertia member of larger diameter and mass than said chuck secured coaxially to said shaft.

3. Apparatus of the class described, comprising a rotary work spindle shaft, a disk member having large rotational inertia and having a relatively thin neck portion secured to said spindle and about which said neck portion said member may flex when rotated at and above critical speed, and a work-holding chuck carried by said member.

4. Apparatus of the class described, comprising a rotary work spindle shaft, a disk member having large rotational inertia and having a relatively thin neck portion secured to said spindle and about which said neck portion said member may flex when rotated at and above critical speed, a work-holding chuck carried by said member, and means for limiting the flexure permitted to said neck portion.

5. Apparatus of the class described, comprising a rotary work spindle shaft, a disk member having large rotational inertia and having a relatively thin neck portion secured to said spindle and about which said neck portion said member may flex when rotated at and above critical speed, said disk member having a recessed outer face, and a work-holding chuck secured to said member within said recess.

MERTON H. ARMS.
LEON J. BARNARD.

REFERENCES CITED

The following references are of record in the file of this patent:

UNITED STATES PATENTS

| Number | Name | Date |
| --- | --- | --- |
| 222,901 | Heckendorn | Dec. 23, 1879 |
| 1,239,873 | Bright | Sept. 11, 1917 |
| 1,544,521 | Sosa | June 30, 1925 |
| 1,762,810 | Brittain et al. | June 10, 1930 |
| 1,766,839 | Roberts | June 24, 1930 |
| 1,778,675 | Kempton et al. | Oct. 14, 1930 |
| 2,327,606 | Saltz | Aug. 24, 1943 |
| 2,371,089 | Weddell | Mar. 6, 1945 |